United States Patent
Hüger et al.

(10) Patent No.: US 12,106,575 B2
(45) Date of Patent: Oct. 1, 2024

(54) METHOD FOR OPERATING A DRIVER ASSISTANCE SYSTEM OF A VEHICLE AND DRIVER ASSISTANCE SYSTEM FOR A VEHICLE

(71) Applicant: Volkswagen Aktiengesellschaft, Wolfsburg (DE)

(72) Inventors: Fabian Hüger, Wolfenbüttel (DE); Peter Schlicht, Wolfsburg (DE); Nico Maurice Schmidt, Berlin (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 427 days.

(21) Appl. No.: 17/619,094

(22) PCT Filed: Jun. 12, 2020

(86) PCT No.: PCT/EP2020/066341
§ 371 (c)(1),
(2) Date: Dec. 14, 2021

(87) PCT Pub. No.: WO2020/249755
PCT Pub. Date: Dec. 17, 2020

(65) Prior Publication Data
US 2022/0266854 A1  Aug. 25, 2022

(30) Foreign Application Priority Data
Jun. 14, 2019 (DE) .................... 10 2019 208 735.3

(51) Int. Cl.
*G06V 20/56* (2022.01)
*B60W 40/02* (2006.01)
(Continued)

(52) U.S. Cl.
CPC ............. *G06V 20/56* (2022.01); *B60W 40/02* (2013.01); *B60W 50/0205* (2013.01);
(Continued)

(58) Field of Classification Search
CPC ...... G06V 20/56; G06V 10/774; G06V 10/82; G06V 10/993; B60W 40/02;
(Continued)

(56) References Cited

U.S. PATENT DOCUMENTS

| 2015/0120190 A1* | 4/2015 | Fuehrer | .................. G01C 21/34 |
| | | | 701/522 |
| 2019/0102668 A1* | 4/2019 | Yao | ........................... G06N 3/04 |

(Continued)

FOREIGN PATENT DOCUMENTS

| DE | 102016212326 A1 | 1/2018 | ............ B60W 40/12 |
| WO | 2020/249755 A1 | 12/2020 | ............ B60W 40/02 |

OTHER PUBLICATIONS

International Search Report and Written Opinion, Application No. PCT/EP2020/066341, 8 pages, Oct. 9, 2020.

*Primary Examiner* — Ali Bayat
(74) *Attorney, Agent, or Firm* — Slayden Grubert Beard PLLC

(57) ABSTRACT

A method for operating a driver assistance system of a vehicle is disclosed, wherein sensor data are recorded from the surroundings of the vehicle, the recorded sensor data are verified, the verified sensor data are analyzed by a neural network and analyzed sensor data are generated. Based on the analyzed sensor data, control data are generated for controlling the vehicle. During verification of the sensor data, at least first sensor data, which were recorded at a first, earlier point in time, are compared with second sensor data, which were recorded at a second, later point in time, the result of the comparison is cross-checked with a database in (Continued)

which data on perturbations to input data of a neural network are stored, wherein it is checked whether the second sensor data were generated at least in part by a perturbation to the first sensor data that is stored in the database.

20 Claims, 7 Drawing Sheets

(51) Int. Cl.
| | |
|---|---|
| *B60W 50/02* | (2012.01) |
| *B60W 60/00* | (2020.01) |
| *G06V 10/774* | (2022.01) |
| *G06V 10/82* | (2022.01) |
| *G06V 10/98* | (2022.01) |
| *B60W 50/00* | (2006.01) |

(52) U.S. Cl.
CPC ......... *B60W 60/001* (2020.02); *G06V 10/774* (2022.01); *G06V 10/82* (2022.01); *G06V 10/993* (2022.01); *B60W 2050/0088* (2013.01); *B60W 2050/0215* (2013.01); *B60W 2420/403* (2013.01); *B60W 2555/20* (2020.02); *B60W 2556/10* (2020.02); *B60W 2556/20* (2020.02)

(58) Field of Classification Search
CPC ........... B60W 50/0205; B60W 60/001; B60W 2050/0088; B60W 2050/0215; B60W 2420/403; B60W 2555/20; B60W 2556/10; B60W 2556/20; G06F 18/214; G06F 16/25; G06F 16/2458; G06F 18/22; G06F 18/2414; G06N 3/04; G06N 3/08
USPC ......................................................... 382/104
See application file for complete search history.

(56) References Cited

U.S. PATENT DOCUMENTS

| | | | |
|---|---|---|---|
| 2019/0263412 A1* | 8/2019 | Saikyo | G06V 20/588 |
| 2022/0126864 A1* | 4/2022 | Moustafa | H04W 4/40 |
| 2022/0172487 A1* | 6/2022 | Ewert | G01S 7/4026 |
| 2022/0219733 A1* | 7/2022 | Abdulkhaleq | B60W 50/023 |

* cited by examiner

METHOD FOR OPERATING A DRIVER ASSISTANCE SYSTEM OF A VEHICLE AND DRIVER ASSISTANCE SYSTEM FOR A VEHICLE

CROSS-REFERENCE TO RELATED APPLICATIONS

This application claims priority to German Patent Application No. DE 10 2019 208 735.3, filed on Jun. 14, 2019 with the German Patent and Trademark Office. The contents of the aforesaid Patent Application are incorporated herein for all purposes.

TECHNICAL FIELD

The present invention relates to a method for operating a driver assistance system of a vehicle, in which sensor data are recorded successively from the surroundings of the vehicle. The recorded sensor data are verified. The verified sensor data are then analyzed by means of a neural network. As a result, analyzed sensor data are generated. Based on the analyzed sensor data, control data are generated for controlling the vehicle in a partially automated or fully automated manner. Furthermore, the invention relates to a driver assistance system for a vehicle, comprising a sensor unit arranged in the vehicle for recording sensor data of the surroundings of the vehicle.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Modern vehicles comprise driver assistance systems, which assist the driver with control of the vehicle or which partially or completely take over the task of driving. By using driver assistance systems of this kind, various levels of vehicle control automation may be achieved. In the case of a low automation level, information and warnings are merely output to the driver. In the case of higher automation levels, the driver assistance system actively intervenes in the control of the vehicle. For example, the steering of the vehicle or the acceleration in the positive or negative direction is intervened with. In the case of an even higher automation level, apparatuses of the vehicle are intervened with such that certain locomotion types of the vehicle, for example straight-ahead driving, may be executed automatically. In the case of the highest automation level, the vehicle may drive autonomously.

In driver assistance systems of this kind, the analysis of digital images recorded from the surroundings of the vehicle during travel is of essential importance. The driver assistance system may only control the vehicle in a reliable manner if the digital images are analyzed correctly. Machine learning has great potential for the analysis of digital images of a driver assistance system. The raw sensor data generated, for example, by a camera, a radar sensor, or a lidar sensor of a vehicle are processed by means of a deep neural network. The neural network generates output data from which the driver assistance system derives relevant information for the partially automated or fully automated driving. For example, the type and position of objects in the surroundings of the vehicle and their behavior are determined. Furthermore, by means of neural networks, the geometry and topology of the roadway may also be determined. Convolutional neural networks, in particular, are particularly suitable for processing digital images.

Deep neural networks of this kind are trained for use in a driver assistance system. In the process, the parameters of the neural network may be suitably adapted by inputting data without the need for intervention on the part of a human expert. For a given parameterization, this involves measuring the deviation of an output of a neural network from a basic truth. This deviation is also referred to as "loss". A so-called loss function is chosen in such a way that the parameters depend thereon in a differentiable manner. Within the context of gradient descent, the parameters of the neural network are then adjusted in each training step depending on the derivative of the deviation, which is determined on the basis of several examples. These training steps are repeated until the deviation, i.e. the loss, no longer decreases.

In this approach, the parameters are determined without the assessment of a human expert or semantically motivated modeling. This results in the neural networks often being largely opaque to humans and their calculations being uninterpretable. As a result, deep neural networks, in particular, often cannot be systematically tested or formally verified.

Furthermore, it creates a problem of deep neural networks being susceptible to adversarial perturbations. Slight tampering of the input data that may barely be perceived or that cannot be perceived at all by a human or tampering that does not alter the situation assessment may lead to output data that differ significantly from the output data that would result without the tampering. Tampering of this kind may be both willfully induced changes to the sensor data as well as randomly occurring image changes caused by sensor noise, weather influences, or certain colors and contrasts.

It is not possible to predict the input features to which a neural network will react so sensitively as for the output data to change significantly even in the event of minor changes to the input data. As a result, synthetic data cannot be used successfully for training neural networks used in driver assistance systems of this kind. It has been shown that neural networks that were trained in simulations or based on other synthetic data exhibit poor performance when used in a driver assistance system with real sensor data. Moreover, it has also been found that implementing a driver assistance system with a neural network in another domain may significantly reduce the functional quality. For example, a driver assistance system having a neural network that was trained in the summer may be unsuitable for use in the winter. The development and release of neural networks for driver assistance systems based on a simulation is therefore problematic.

There is therefore a need to develop neural networks for driver assistance systems that are robust to perturbations. The neural networks should also generate output data that may be used for the driver assistance system even if the input data have been perturbed.

When using the neural network in a driver assistance system, it should also be identified whether the recorded sensor data are authentic. It should be possible for the sensor data to be verified reliably. It should in particular be identified whether the sensor data have been altered by an adversarial perturbation.

SUMMARY

A need exists to provide a method and a driver assistance system of the type mentioned at the outset in which the recorded sensor data are verified reliably.

The need is addressed by a method and a driver assistance system having the features of the independent claims. Embodiments of the invention are described in the dependent claims, the following description, and the drawings.

DESCRIPTION

Figure 1:
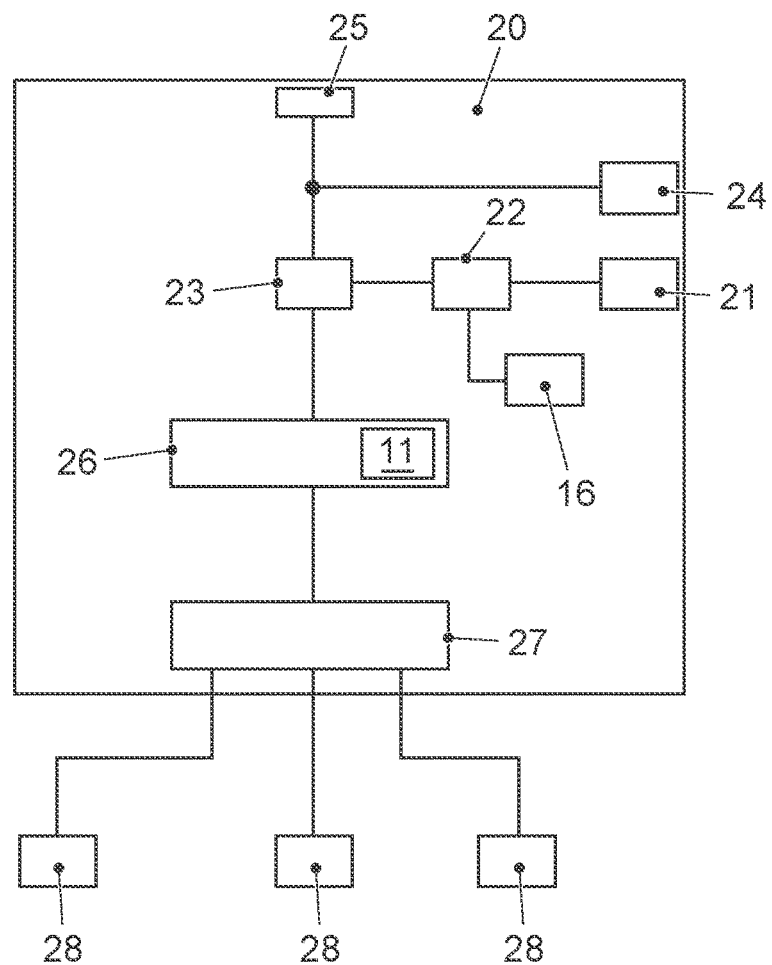
FIG. 1 schematically shows a structure of an exemplary embodiment of a driver assistance.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In a method for operating a driver assistance system of a vehicle according to a first exemplary aspect, sensor data are recorded successively from the surroundings of the vehicle. The recorded sensor data are verified. During verification of the sensor data, at least first sensor data, which were recorded at a first, earlier point in time, are compared with second sensor data, which were recorded at a second, later point in time. The result of the comparison is cross-checked with data of a database in which the data on perturbations to input data of a neural network are stored, wherein it is checked whether the second sensor data were generated at least in part by means of a perturbation to the first sensor data that is stored in the database. The verified sensor data are then analyzed by means of a neural network. As a result, analyzed sensor data are generated. On the basis of the analyzed sensor data, control data are then generated for controlling the vehicle in a partially automated or fully automated manner.

In the method, the sensor data recorded from the surroundings of the vehicle are reliably verified based on perturbations stored previously in a database. In this way, it is possible to reliably identify known adversarial perturbations for neural networks that are used in a driver assistance system when using the neural network in a driver assistance system. The perturbations may in particular be detected in real time. In this way, it is also possible to distinguish temporal changes to the sensor data caused by natural changes in the environment of the vehicle from adversarial perturbations.

The sensor data are in particular digital images of a camera of the vehicle. The digital images record the surroundings of the vehicle. The sensor data are in particular raw sensor data, in particular raw sensor data of the camera.

Furthermore, the sensor data may be data generated by a radar sensor or lidar sensor. In this case, too, the sensor data are in particular raw sensor data.

The database in which the data relating to perturbations to input data of the neural network are stored is in particular arranged in the vehicle. Therefore, when cross-checking the comparison of the sensor data recorded at different points in time with the database, the database may be accessed directly, i.e., without a wireless interface. This ensures that the cross-checking may be carried out at any time in the vehicle, even when the vehicle has no data connection to external apparatuses.

The data stored in the database in particular describe naturally occurring perturbations. These may for example be weather influences, such as fog or snow, sensor noise, camera soiling, or changes caused by textures. Furthermore, naturally occurring perturbations are naturally occurring objects in the surroundings of a vehicle, for example printed posters or stickers on objects. Alternatively, other perturbations, for example artificial perturbations, may also be stored in the database, wherein a classification of the perturbations is additionally stored, such that, during the cross-checking of the result of the comparison of the sensor data recorded at different points in time with the database, it may be checked whether a change to the sensor data was caused by a naturally occurring perturbation or another, for example artificial, in particular adversarial, perturbation.

For example, if a pattern or grid is superimposed on the sensor data in the event of an adversarial perturbation, this may be detected by the verification by means of a plausibility check, since patterns or grids of this kind are not naturally occurring perturbations.

If the cross-check reveals that changes to the sensor data were caused by a naturally occurring perturbation, the sensor data may be verified. If this is not the case, there is a high probability that the change to the sensor data was caused by an adversarial perturbation. In this case, the sensor data are not verified and these sensor data are then not used for generating the analyzed sensor data by means of the neural network.

In some embodiments, the verified sensor data are checked for plausibility in that supplementary sensor data are obtained from the surroundings of the vehicle, the supplementary sensor data are analyzed, deviations of the second sensor data from the first sensor data are determined, and it is checked whether the deviations are in line with the analysis of the supplementary sensor data. One cause for deviations in the sensor data recorded at different points in time is the movement of the vehicle relative to the surroundings. However, in addition to these deviations associated with the movement of the vehicle, deviations that result from a change in the environment may also be created. By means of the supplementary sensor data, it may be checked whether these other deviations are caused by such environmental changes. By means of the plausibility check, an adversarial perturbation that corresponds to or resembles a naturally occurring perturbation may be identified. For example, if the sensor data reveal that the weather conditions have changed such that fog appears in the surroundings of the vehicle, the plausibility of this may be checked by means of the supplementary sensor data. For example, if an optical sensor shows that there is no fog, i.e., that visibility is good, it may be recognized that the changes to the sensor data that could have been caused by fog were actually caused by an adversarial perturbation. By means of the plausibility check of the sensor data, the verification of the sensor data obtained may be improved further. As a result, the reliability during use of the method in a driver assistance system is increased.

During the analysis of the supplementary sensor data, visibility conditions in the surroundings of the vehicle are obtained, in particular. It is then checked whether the deviations of the second sensor data from the first sensor data at least partially result from the visibility conditions in the surroundings of the vehicle. The visibility conditions in the surroundings of the vehicle may be checked in a particularly simple manner by means of sensors that are usually already present in the vehicle, and independently of the sensors of the driver assistance system. In this way, an adversarial perturbation of the driver assistance system may be detected by sensors that are not directly used by the driver assistance system to generate the control data. This also increases the reliability during operation of the method in a driver assistance system.

In some embodiments, an improved set of parameters of the neural network used in the method is generated by means of the following steps:
  a. providing a neural network with the associated set of parameters,
  b. generating training data by means of an example sensor data set,
  c. generating a first analysis of the example data set on the basis of the training data by means of the neural network,
  d. generating perturbed input data as training data for the example sensor data set by means of the above-described method for generating perturbed input data for a neural network,
  e. generating a second analysis of the example sensor data set on the basis of the perturbed input data by means of the neural network,
  f. comparing the first and second analysis, and
  g. generating an improved set of parameters for the neural network on the basis of the result of the comparison of the first and second analysis.

The example sensor data set is in particular an example digital image. The sensor data used to improve the set of parameters are previously obtained sensor data that are used to train the neural network. However, these sensor data may show similar sensor data, for example similar digital images, to those generated in the field during use of the method in a driver assistance system.

The improved set of parameters may therefore be obtained by training the neural network. The training is carried out for perturbed and unperturbed sensor data, i.e., digital images, in particular. The improved set of parameters therefore results from a gradient descent (adversarial training), for example.

In these embodiments, the perturbed input data may in particular be generated in that a first metric is defined, which specifies how the extent of a change to a digital image is measured, and in that a second metric is defined, which specifies what a perturbation of the input data of a digital image is directed at. An optimization problem is then generated from a combination of the first metric and the second metric. The optimization problem is solved by means of at least one solution algorithm, wherein the solution specifies a target perturbation of the input data, and perturbed input data are generated for the neural network from sensor data by means of the target perturbation.

The sensor data are in particular digital images. Therefore, in this case, the target perturbation generates perturbed, i.e., altered, digital images, which form the input data for the neural network that analyzes the digital image.

In the method according to the present exemplary aspect, possible adversarial perturbations of a neural network used to analyze sensor data are considered at a structural level. The perturbation is considered as a composition of different elements for which different metrics are defined. Surprisingly, this had the result that randomly composed perturbations are no longer exclusively used, but rather it becomes possible to generate a large number of new adversarial target perturbations based on known perturbations by analyzing the structure of known perturbations with regard to the metrics.

In the method, an optimization problem is generated from two metrics that measure changes to sensor data, in particular a digital image. There is a large number of known solution algorithms for an optimization problem of this kind. The optimization problem may therefore be solved by means of these solution algorithms. As a result, a target perturbation of the input data is generated. By means of this target perturbation, perturbed input data may then be generated for the neural network from sensor data. The neural network may then be tested and trained based on these perturbed input data. Beneficially, the method according to the present exemplary aspect makes it possible to generate new perturbations in a very quick and simple manner.

The first metric used in the method specifies how the extent of a change to sensor data is measured. If the sensor data is a digital image of a camera, the perturbation for testing the neural network should usually be as small as possible. The first metric specifies how the extent of the change to the digital image may be quantified. For example, a digital image may be changed in that the pixels of the image are shifted, rotated, or reflected. The first metric specifies the extent of the change during such transformations. A rotation or translation of a digital image may be defined according to the first metric by means of a fixed point and the angle of rotation or the distance of translation in the horizontal and vertical direction. Furthermore, for each pixel of the image, the first metric may determine the image distances by determining the sum of the differences of all pixel values. The pixel value may for example be a gray scale value or a color value. For each pixel, the difference of the pixel value is formed for the original image and for the perturbed image. This difference is determined for each pixel and the differences are then added together. This results in an image distance that specifies the difference between the two images according to the first metric.

Furthermore, altered image regions may also be considered according to the first metric. The image regions may be defined by a starting point and an extension in the horizontal and vertical direction, or by a list of pixels. Image distances may be determined for these image regions according to the first metric.

Furthermore, the first metric may specify the extent of a change to a digital image in relation to image characteristics, for example luminance, contrast, and/or structure values, or any combinations thereof.

Restrictions may also be applied when defining the first metric, for example that the changes that are considered for the first metric only take into account image regions in which specific image characteristics are present, for example. For example, only regions in which the contrast exceeds a defined threshold value may be considered.

In some embodiments, the second metric relates to a change in the classification of objects. In particular, it measures the deviation of the true model output from the desired false model output, i.e., the target of the adversarial perturbation. For example, in the case of a digital image, small image regions or a small number of pixels may be perturbed such that an object in the digital image is no longer detected as a road user, for example a pedestrian, but rather as an otherwise classified object, for example a region of a roadway. Furthermore, the perturbation may be directed toward always detecting a road as an empty road without other road users whenever a region is detected as a road.

In some embodiments, the second metric may be directed at the disappearance of objects. For example, the perturbation is directed toward changing detected objects such that they disappear. The second metric may also relate solely to specific image regions. For example, the perturbation described by the second metric may be directed toward prohibiting objects of a specific class from appearing in a specific image region.

In some embodiments, the second metric relates to a change to an object of a specific class. For example, an object may be detected and classified. For example, an image region may be assigned to a road user. The second metric is then directed, for example, toward displaying said object larger or smaller or at a different position. For example, objects classified as pedestrians may be displayed larger or smaller. The enlargement is in this case defined by the absolute number of pixels by which the object is enlarged or reduced in size by the perturbation on the left, on the right, at the top or at the bottom.

There are a wide variety of possible perturbations that may be described by the second metric. Any changes may be made to the sensor data in order to alter the sensor data such that safety-related results, in particular, may no longer be obtained correctly during the analysis of the sensor data in a driver assistance system. For example, a pattern or a grid may be applied to the sensor data such that, in the case of a digital image, objects of a specific class, such as pedestrians, disappear, whereas other objects continue to be classified correctly. In particular, second metrics that measure the naturally occurring perturbations are relevant for the application of the method according to the present exemplary aspect in a driver assistance system: the model output appears plausible, but deviates from the truth in certain, safety-related details.

In some embodiments, the perturbations described by the first and/or second metric are naturally occurring perturbations. Therefore, for application in a driver assistance system, a selection is made for the possible perturbations described by the first and/or second metric that is especially relevant for checking and improving neural networks for use in a driver assistance system.

In some embodiments, the first and/or second metrics are stored in a database. A data set relating to a naturally occurring perturbation measured using the first and/or second metric is then loaded from the database. The metrics for possible perturbations to the input data (first metrics) and for possible changes to the model outputs (second metrics) may for example be stored in the database. In some embodiments, a data set relating to a naturally occurring perturbation (measured using a first metric) and for a possible target (a notified change to the model output—e.g. overlook all pedestrians—measured using a second metric) is then loaded from the database.

In some embodiments, the perturbed input data may in particular also be generated by defining a first group containing first metrics that each provide a different specification as to how the extent of a change to sensor data is measured and by defining a second group containing second metrics that each provide a different specification as to what a perturbation of sensor data is directed at, by selecting any combination of a first metric from the first group and a second metric from the second group, by generating an optimization problem from the selected combination of the first and second metric, by solving the optimization problem by means of at least one solution algorithm, wherein the solution specifies a target perturbation of the input data, and by generating perturbed input data for the neural network from sensor data by means of the target perturbation.

The benefit of this method is that any first metric from the first group and any second metric from the second group may be used to arrive at a target perturbation by solving the optimization problem. The more metrics the first and second group contain, the more different target perturbations may be generated by the method. As such, a very large number of target perturbations may be generated.

In some embodiments, the first group comprises at least two, in particular at least five, different first metrics. However, the first group may also contain more than 10, 20, or more than 100 metrics.

In some embodiments, the second group comprises at least two, in particular at least five, different second metrics. However, the second group may also contain more than 10, 20, or more than 100 metrics.

The first and/or the second metric of the first or second group may in particular comprise the features of the like described above in isolation or in combination.

In some embodiments, a third metric is defined, which specifies what type of sensor data a third perturbation is used for. For example, the perturbation is applied to all data, to only one data point, or to data meeting certain conditions, for example all data involving multi-lane roads. The optimization problem is then generated from a combination of at least two metrics from the first, second and third metric. In particular, the optimization problem is generated from a combination of the first, second and third metric. The sensor data are in particular digital images. These are analyzed by means of a neural network in a driver assistance system, in particular.

The third metric may in particular relate to all sensor data, for example all digital images. For example, the perturbation may cause objects of a specific class to disappear in all digital images.

Moreover, the third metric may only affect a subset of the sensor data, in particular of the digital images. The perturbation may for example only describe digital images that contain objects of a specific class, for example objects classified as pedestrians. Furthermore, the third metric may describe digital images that were recorded on days with snowfall or rain. As a result, the perturbed input data for the neural network may, for example, produce a different assessment of a specific traffic situation or environmental situation when used in a driver assistance system.

In some embodiments, the third metric only describes sensor data that contain a specific object. Alternatively or additionally, the third metric may select only one specific digital image.

In some embodiments, any combination of a first metric from the first group, a second metric from the second group, and the third metric is selected. The optimization problem is then generated from the selected combination of the first, second, and third metric.

The third metric may in particular comprise the features as described above in isolation or in combination.

The optimization problem, which has been generated on the basis of the metrics, may be represented as follows: In the event of a predefined maximum change to a digital image, for example by means of rotation of a specific image region, the number of pixels classified as people is to be minimized, and, specifically, for as many images as possible in which people appear.

In another example, in the event of a minimal change to the input image, the number of pixels classified as a person is to be minimized in regions of high contrast, and, specifically, for as many images as possible in which people appear.

In the method according to the present exemplary aspect, a solution algorithm is specified for optimization problems of this kind. In some embodiments, the solution algorithm comprises iterative methods using the gradients of the neural network to determine the directions of change. Furthermore, iterative methods using sampling, evaluation, and combinations thereof may be used.

In some embodiments, a Monte Carlo method is used as the solution algorithm, in which, for example, noise is generated for a digital image, and the result is checked. In some embodiments, a genetic algorithm may be used to solve the optimization problem.

The solution to the optimization problem may for example be a perturbed digital image or a perturbation by means of which sensor data may be perturbed in order to generate perturbed input data for a neural network. The perturbed sensor data or the perturbed digital image then constitute the input data for the neural network to be checked. A perturbation may also be applied to a set of input data by combining at the pixel level, for example by means of summation.

If the sensor data are digital images, the first and second analysis may include semantic segmentation of the digital image, detecting objects in the digital image, classifying objects in the digital image, or detecting the position of an object in the digital image. Moreover, the analyses may be used to identify how an object in the digital image changes. These analyses are particularly relevant for use of the neural network in a driver assistance system, and therefore it is important that the neural network is robust to perturbations that occur during such analyses, and thus that few changes occur during the analysis when perturbed input data are used.

In some embodiments, a solution algorithm group is defined, which contains multiple solution algorithms that each provide a different solution to the optimization problem in order to generate different target perturbations of the input data. Any solution algorithm from the solution algorithm group is then selected in order to generate perturbed input data for the neural network from sensor data. In this way, an even larger number of target perturbations may be generated, since the solution algorithm may also be varied, wherein each solution algorithm arrives at different target perturbations.

The solution algorithms of the solution algorithm group may comprise iterative methods using the gradients of the neural network to determine the directions of change as well as sampling-based methods, gradient-based methods, gradient-based methods with momentum, and/or surrogate model-based methods.

The invention further relates to a driver assistance system for a vehicle. The driver assistance system according to a further exemplary aspect comprises a sensor unit arranged in the vehicle for recording sensor data of the surroundings of the vehicle. Furthermore, it comprises a verification unit for verifying the recorded sensor data, wherein the verification unit, during verification of the sensor data, is designed to compare at least first sensor data that were recorded at a first, earlier point in time with second sensor data that were recorded at a second, later point in time, to cross-check the result of the comparison with data of a database in which data relating to perturbations of input data of a neural network are stored, wherein it is checked whether the second sensor data were generated at least in part by means of a perturbation to the first sensor data that is stored in the database. Furthermore, the driver assistance system comprises an evaluation unit, which is coupled to the sensor unit and in which a neural network is stored and which is designed to analyze the verified sensor data by means of the neural network and thereby generate analyzed sensor data. Furthermore, the driver assistance system comprises a control unit, which is coupled to the evaluation unit and which is designed to generate control data for controlling the vehicle in a partially automated or fully automated manner on the basis of the analyzed sensor data.

The driver assistance system is in particular designed to execute the method according to the first aspect. It therefore has the same benefits.

The data relating to perturbations of input data stored in the database in particular comprise perturbed input data for a neural network of the like also stored in the evaluation unit. Alternatively, however, data relating to perturbations of input data for any desired neural networks may also be stored in the database, and therefore the database may be designed for the use of various neural networks in the evaluation unit.

The sensor unit is in particular a camera for recording digital images. The digital images thus record the surroundings of the vehicle. The camera is in particular arranged in the vehicle. Similarly, the database is for example also arranged in the vehicle and coupled to the verification unit via a wire connection.

In some embodiments of the driver assistance system, the verification unit is designed to determine deviations of the second sensor data from the first sensor data. Furthermore, according to these embodiments, the driver assistance system comprises a supplementary sensor unit, which is designed to obtain supplementary sensor data from the surroundings of the vehicle. The driver assistance system in particular also comprises a plausibility unit, which is coupled to the supplementary sensor unit and to the verification unit and which is designed to analyze the supplementary sensor data and to check whether the deviations are in line with the analysis of the supplementary sensor data. In the process, it may in particular be checked whether the deviations may arise from perturbations that were determined by analyzing the supplementary sensor data.

The invention will now be explained based on further exemplary embodiments with reference to the FIGS.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

An exemplary embodiment of the driver assistance system 20 will be explained below with reference to FIG. 1.

The driver assistance system 20 comprises a sensor unit 21, which is arranged in the vehicle. The exemplary embodiment is a camera that records digital images of the surroundings of the vehicle. When the vehicle is being used, said digital images may be generated successively.

The sensor unit 21 is connected to a verification unit 22. The verification unit 22 may verify the sensor data recorded by the sensor unit 21, i.e. determine whether undesired changes, in particular adversarial perturbations, have affected the sensor data. In this way, the sensor data are also authenticated, i.e. the unchanged origin of the sensor data from the sensor unit 21 is checked. For this purpose, the verification unit 22 compares sensor data that were recorded at different points in time, in particular successive sensor data sets. For example, two successive sensor data sets may be compared. However, it is also possible for a large number of successive sensor data sets to be compared in order to identify changes. The verification unit 22 determines deviations of sensor data recorded later from sensor data recorded earlier.

The verification unit 22 is coupled to a database 16. Data relating to perturbations to input data of a neural network are stored in the database 16. The database 16 distinguishes between whether the perturbation is a natural perturbation and whether this is not the case. A natural perturbation is understood to be a perturbation that influences sensor data, in the present case digital images, of the surroundings of the vehicle in the same way as they may be caused by naturally occurring phenomena in the surroundings of the vehicle.

The change to a digital image caused by a natural perturbation corresponds, for example, to the change to a digital image of the like that results from the occurrence of weather phenomena such as fog, snowfall, or rain. Furthermore, natural perturbations are understood to be image changes in which objects are inserted into the image or disappear from the image, as may also occur in the surroundings of a vehicle. For example, a poster or sticker on an object may appear in the surroundings of the vehicle.

Other, unnatural perturbations include, in particular, adversarial perturbations of a neural network that are intended to disrupt reliable operation of the driver assistance system. Such perturbations are marked in the database 16. In this way, the verification unit 22 may be used to determine whether a change to sensor data was caused by a natural perturbation or whether it is likely that the change was caused by an adversarial perturbation. The verification unit 22 is designed to cross-check the result of the comparison of the sensor data recorded at different points in time with the data of the database 16. In the process, it may be checked whether the sensor data recorded later were generated at least in part by means of a perturbation to the first sensor data that is stored in the database. If it turns out that the changes were not caused by natural perturbations, the verification unit 22 verifies the recorded sensor data and transmits same to a plausibility unit 23.

The plausibility unit 23 is connected to a supplementary sensor unit 24. Alternatively or additionally, the plausibility unit 23 may also be connected to an interface 25 via which the supplementary sensor data may be transmitted to the plausibility unit 23. For example, the supplementary sensor unit 24 detects the visibility in the surroundings of the vehicle, and, specifically, independently of the sensor unit 21 designed as a camera. Alternatively or additionally, weather data may also be transmitted to the plausibility unit 23 via the interface 25. Based on this, the plausibility unit 23 may determine the visibility in the surroundings of the vehicle.

The plausibility unit 23 may then analyze the supplementary sensor data and check whether the deviations between the recorded sensor data determined by the verification unit 22 are in line with the analysis of the supplementary sensor data. If, for example, the verification unit 22 reveals that the visibility in the surroundings of the vehicle has significantly reduced, since the digital images recorded by the sensor unit 21 show the emergence of fog, and the supplementary sensor data that were transmitted from the supplementary sensor unit 24 or via the interface 25 to the plausibility unit 23 show that clear visibility conditions prevail, the plausibility check in the plausibility unit 23 is negative. Even though the change to the recorded sensor data of the sensor unit 21 may have been caused by a natural perturbation, there is a high probability that this change was caused by an adversarial perturbation. In such a case, the implausible sensor data are not processed further.

The plausibility unit 23 is coupled to an evaluation unit 26. A neural network 11 is stored in the evaluation unit 26. The evaluation unit 26 is designed to analyze the verified and plausible sensor data by means of the neural network 11 and thereby generate analyzed sensor data. This analysis takes place in a manner known per se. The digital images are, for example, semantically segmented and the detected objects in the digital images are assigned to various classes. In this way, it is possible to determine, for example, whether a pedestrian is on a roadway and how said pedestrian is moving relative to the vehicle and relative to the roadway.

The evaluation unit 26 is coupled to a control unit 27. The control unit 27 is designed to generate control data for controlling the vehicle in a partially automated or fully automated manner on the basis of the analyzed sensor data. Said control data are transmitted from the driver assistance system 20 to actuators 28, which control the steering and the propulsion or braking of the vehicle, for example. Furthermore, the actuators 28 may control signals emanating from the vehicle. Partially automated or fully automated control of the vehicle of this kind by means of a driver assistance system 20 is known per se.

Figure 2:
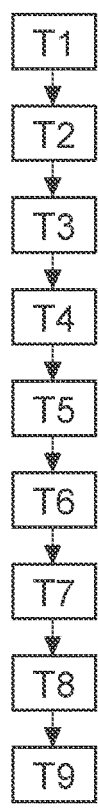
FIG. 2 schematically shows an exemplary embodiment of a method for operating a driver assistance system in a vehicle.

An exemplary embodiment of the method for operating the driver assistance system 20 will be explained below with reference to FIG. 2:

In a step T1, sensor data are recorded successively from the surroundings of the vehicle by means of the sensor unit 21.

In a step T2, first sensor data, which were recorded at a first, earlier point in time, are compared with second sensor data, which were recorded at a second, later point in time. A result of the comparison is produced.

In a step T3, the result of the comparison is cross-checked with the data of the database 16. In the process, it is taken into account whether the data of the database 16 are associated with perturbations that may have a natural cause or with adversarial perturbations.

In a step T4, it is checked whether the second sensor data were generated at least in part by means of a perturbation to the first sensor data that is stored in the database. If said stored perturbation is a natural perturbation, the recorded sensor data are verified in a step T5.

In a step T6, the plausibility of the verified sensor data is checked. For this purpose, supplementary sensor data are obtained from the surroundings of the vehicle and the supplementary sensor data are analyzed. Furthermore, deviations of the second sensor data from the first sensor data are determined and it is checked whether the deviations are in line with the analysis of the supplementary sensor data.

In a step T7, the verified and plausible sensor data are analyzed by means of a neural network 11. In a step T8, analyzed sensor data are generated thereby.

Finally, in a step T9, control data for controlling the vehicle in a partially automated or fully automated manner are generated on the basis of the analyzed sensor data and then output.

In one example of the exemplary embodiment of the method and in one example of the exemplary embodiment of the driver assistance system 20, a set of parameters for the neural network 11 used is obtained in a particular manner. Perturbed input data that were obtained in a specific manner are generated for training the neural network 11 prior to actual use in a driver assistance system 20.

Figure 3:
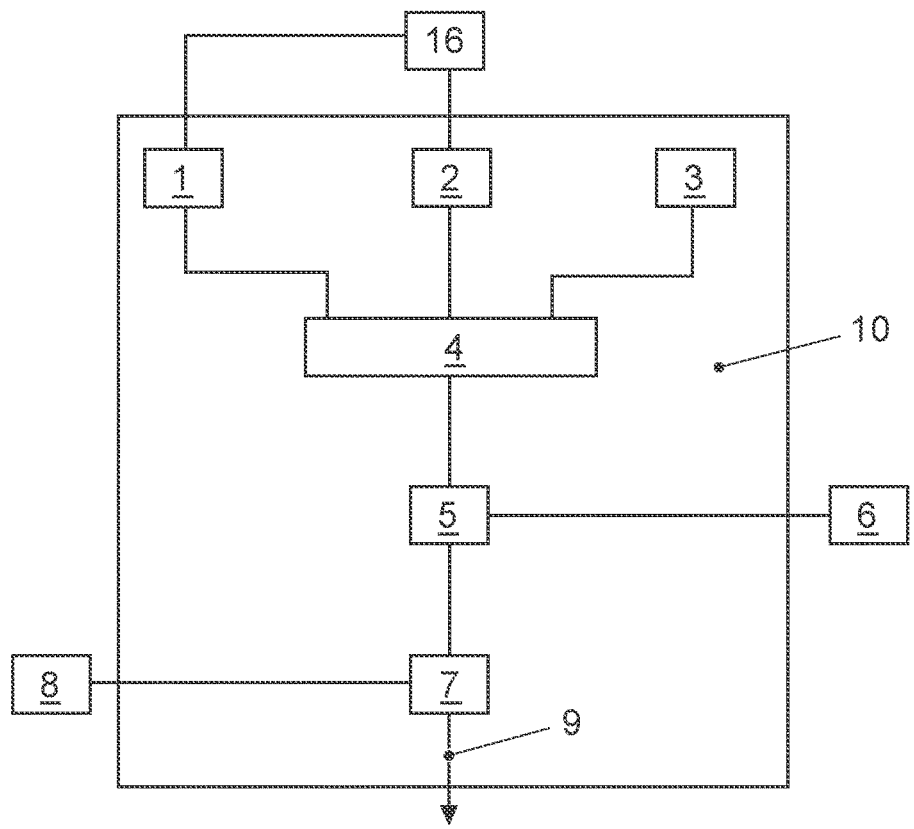
FIG. 3 schematically shows a structure of an exemplary generator for generating perturbed input data.

In this regard, an exemplary embodiment of the generator 10 for generating perturbed input data for a neural network for analyzing digital images of the exemplary embodiment of the driver assistance system will be described in the following with reference to FIG. 3.

In the case of this exemplary embodiment, sensor data are analyzed by a neural network or perturbed input data are generated for a neural network from such sensor data. In the exemplary embodiments, the sensor data are raw data from sensors of a vehicle that were obtained prior to actual use of the neural network in a driver assistance system. The sensor may be a camera, a radar sensor, a lidar sensor, or any other sensor that generates sensor data that are processed further in a driver assistance system. In the following, by way of example, the sensor data are digital images recorded by a camera of a vehicle. However, other sensor data may also be used in the same way.

The generator 10 comprises a first metric unit 1, a second metric unit 2, and a third metric unit 3. The first metric unit 1 comprises a first metric, which specifies how the extent of a change to digital images is measured. The first metric unit 1 defines how the extent of a change to digital images is measured. The definition of the first metric may be input into the first metric unit 1. However, the first metric unit 1 may also access a database 16 via an interface, in which database data with a large number of possible definitions for metrics that measure the extent of a change to digital images is stored. For example, the first metric may compare the image distances between two digital images and output a value for said image distance. The image distance may for example be defined by the sum of the differences of all pixel values of the digital images to be compared.

In the exemplary embodiment, the first metric unit 1 selects a perturbation that is as natural as possible from the database 16. A natural perturbation is understood to be a perturbation that influences digital images of the surroundings of the vehicle in such a way as may occur on account of naturally occurring phenomena in the surroundings of the vehicle. The change to a digital image caused by a natural perturbation corresponds, for example, to the change to a digital image of the like that results from the occurrence of weather phenomena such as fog, snowfall, or rain. Furthermore, natural perturbations are understood to be image changes in which objects are inserted into the image or disappear from the image, as may also occur in the surroundings of a vehicle. For example, a poster or sticker on an object may be inserted in the surroundings of the vehicle. Other, unnaturally occurring perturbations of the like that may also be contained in the database 16 are not taken into account by the first metric unit 1, since these are less relevant for the testing of a neural network being used in a driver assistance system.

The second metric unit 2 comprises a second metric, which specifies what a perturbation of the input data of the digital images is directed at, i.e. the second metric defines what a perturbation of a digital image is directed at. The definition of the second metric may be transmitted by means of an input to the second metric unit 2. Equally, the second metric unit 2 may also be coupled to the database 16 in which data relating to a large number of perturbations directed at a specific change to digital images are stored. This may be collections of such perturbations.

In the exemplary embodiment, the second metric unit 2 selects a perturbation that is as plausible as possible from the database 16. A plausible perturbation is understood to be a perturbation that results in a seemingly realistic model output but that differs herefrom in relevant details. In the case of a plausible perturbation, correct segmentation, for example, takes place, but the lane markings have been consistently shifted. Other, implausible perturbations of the like that may also be contained in the database 16 are not taken into account by the second metric unit 2, since these are less relevant for the testing of a neural network being used in a driver assistance system. Highly implausible model outputs may in fact be easily detected.

The second metric may for example be directed at increasing the size of all objects assigned to a specific class, for example the class of pedestrians. The perturbation therefore generates a digital image in which an object of the original image that is classified as a pedestrian is enlarged iteratively in all four directions, wherein the resulting segmentation of the perturbed digital image is recombined. The result is a digital image in which all objects that do not belong to the class of pedestrians remain unchanged, but objects that belong to the class of pedestrians are shown enlarged. The other objects are only changed insofar as they were changed by the enlargement of the objects of the pedestrian class.

The third metric unit 3 comprises a third metric that specifies what type of digital images the perturbation is used for. For example, the metric may define that the perturbation is only applied to digital images that show other road users, i.e. pedestrians, cyclists, and other vehicles, for example.

The three metric units 1 to 3 are connected to a processing unit 4. The processing unit 4 is designed to generate an optimization problem from the three metrics of the first to third metric unit 1 to 3. For example, the optimization problem comprises a loss function for a neural network that contains a perturbation parameter as a parameter and an image resulting from the perturbation (second metric). With regard to the optimization problem, the aim is to find the minimum of the perturbation parameter, and, specifically, for the digital images defined according to the third metric and with the proviso that the extent of the change to the generated image relative to the original image according to the first metric is below a specific value.

The processing unit 4 transmits the optimization problem as a data set to a solution unit 5. The solution unit 5 is coupled to a database 6 in which at least one solution algorithm, for example a large number of solution algorithms, for optimization problems is stored. Solution algorithms of this kind are known per se. For example, Monte Carlo methods, genetic algorithms, and/or gradient-based methods may be stored in the database 6, which the solution unit 5 may access. By means of these solution algorithms, the solution unit 5 may generate a target perturbation of the input data from digital images as the solution to the optimization problem. The target perturbation thus generates a perturbed digital image, which may be used as input data for a neural network for analyzing digital images. The neural network is configured, in particular, to analyze digital images of a driver assistance system.

The solution unit 5 transmits the target perturbation to a generation unit 7. The generation unit 7 is further coupled to a database 8 in which a large number of digital images are stored. By means of the target perturbation, the generation unit 7 may perturb digital images of the database 8 in such a way that perturbed input data 9 of the digital images are generated for a neural network. The perturbed input data 9 are then output by the generation unit 7. These perturbed input data 9 may then be used to test or train a neural network or to improve the set of parameters of the neural network.

Figure 4:
FIG. 4 schematically shows an exemplary method for generating perturbed input data.

An exemplary embodiment of the method for generating perturbed input data 9 will be explained with reference to FIG. 4:

In a step S1, a first metric is defined, which specifies how the extent of a change to digital images is measured. The first metric or a data set describing the first metric is stored in the first metric unit 1.

In a step S2, a second metric is defined, which specifies what a perturbation of the digital images is directed at. This second metric or a data set describing the second metric is stored in the second metric unit 2.

Finally, in a step S3, a third metric is defined, which specifies what type of digital images a perturbation is used for. This third metric or a data set describing said third metric is stored in the third metric unit 3.

In a step S4, the data sets that describe the three metrics are transmitted to the processing unit 4.

In a step S5, the processing unit 4 generates an optimization problem from a combination of the three metrics. In a step S6, the processing unit 4 transmits a data set that describes the generated optimization problem to the solution unit 5.

In a step S7, the solution unit 5 solves the optimization problem by means of at least one solution algorithm that was transmitted to the solution unit 5 for example by accessing the database 6. The solution is a target perturbation for digital images.

In a step S8, a data set for this target perturbation is transmitted to the generation unit 7.

In a step S9, the generation unit 7 generates perturbed digital images as input data 9 for a neural network by accessing the database 8. These perturbed input data 9 are output in a step S10.

Figure 5A:
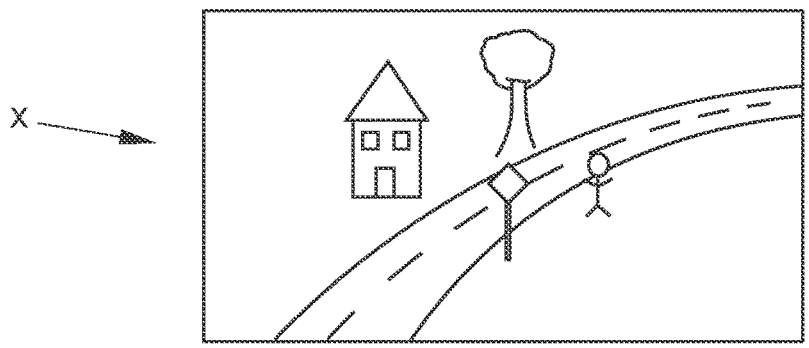
FIG. 5 shows an example of a perturbation.

In the following, the method will be explained in detail based on an example in which objects of the pedestrian class are enlarged:

In the following, the method will be explained in detail with reference to FIG. 5A to 5C based on an example in which objects of the pedestrian class are enlarged:

A model M is provided. This model has the input x. This input x is a digital image of the like shown in FIG. 5A. Furthermore, the output M(x)=y is defined. A perturbation is denoted by $\Delta$, such that the altered input x'=x+$\Delta$ is produced. The altered output is thus y'=M(x+$\Delta$). The target output is denoted by y".

Figure 5B:
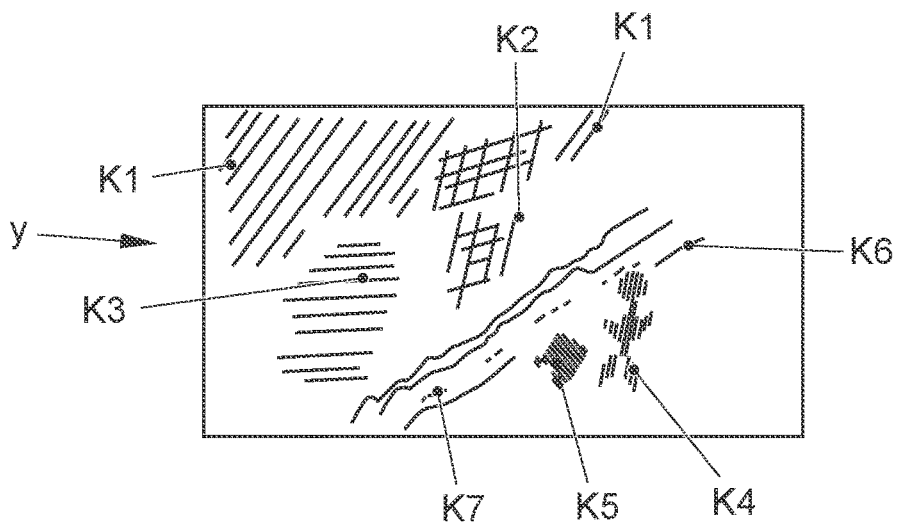

FIG. 5B shows the output y of the model M. The digital image x has been segmented, i.e. classes have been assigned to the pixels of the digital image x, as shown in FIG. 5B. The following class assignments resulted:

K1: Sky;
K2: Nature;
K3: Building;
K4: Pedestrian;
K5: Traffic sign;
K6: Road;
K7: Marking.

Figure 5C:
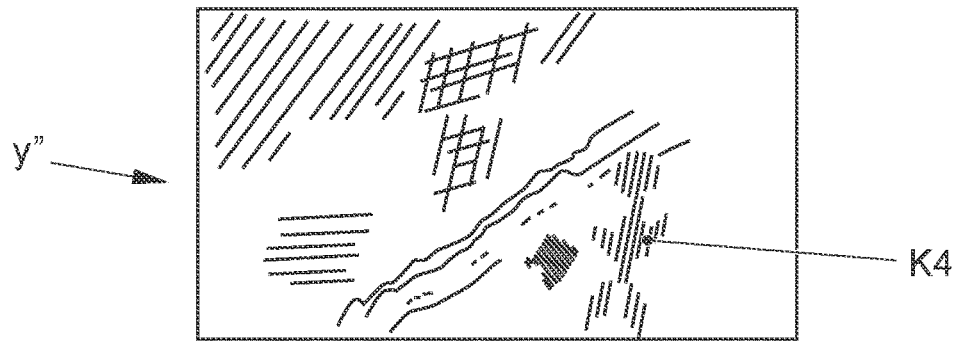

The target output y", which is to be generated by means of the perturbation $\Delta$, is shown in FIG. 5C. The aim of the perturbation $\Delta$ is to show the pedestrian enlarged. A shift of individual pixel values by the value of at most 3 is defined as the target perturbation. The target data consist of a concrete image x.

The first metric is then defined as follows:

$$d_1(\Delta) = \|\Delta\|_\infty = \max_{pixel}|\Delta(\text{pixel})|$$

The magnitude of the perturbation is thus measured as the maximum pixel value between 0 and 255 in the perturbation $\Delta$.

The second metric is defined as follows:

$$d_2(\Delta) = \|M(x+\Delta) - y''\|_1 = \|y' - y''\|_1 = \sum_{pixel}|y'(\text{pixel}) - y''(\text{pixel})|$$

It defines the sum of the pixel deviations from the target output.

The third metric is defined as follows:

$$d_3(x') = \begin{cases} 0; x' = x \\ 1; x' \neq x \end{cases}$$

Thus, according to this third metric, only the input image x has a small size. Consequently, the attack only applies to the input image x if $d_3(x')<1$ is stipulated. The focus with regard to the data to be attacked changes dramatically if $d_3(x')<2$ is stipulated: In this case, the attack applies to all images.

The optimization problem is then formed from these three metrics as follows:

$$\overline{\Delta} = \operatorname*{argmin}_{d_1<3; d_3(x')<1}\left(d_2(\Delta)\right)$$

According to the optimization problem, a $\Delta$ is to be found such that $d_2(\Delta)$ is minimal, wherein $d_1(\Delta)<3$ is on x.

This optimization problem may be solved using solution algorithms that are known per se. This produces a new adversarial perturbation from already known ($d_1$, $d_3$) and new ($d_2$) metrics. Furthermore, by recombining already known metrics ($d_1, \ldots, d_3$) in a novel manner or by linking them to another solution algorithm, new adversarial perturbations may also be created. The method thus makes it possible to construct almost any number of novel adversarial perturbations in a simple manner.

According to one variant of this example, for the first metric, it is possible only to allow pixel changes in an image region that are classified as "tree". This produces the following optimization problem: A $\Delta$ is to be found in "tree" image regions in the digital image x such that $d_2(\Delta)$ is minimal, with $d_1(\Delta)<3$.

According to another variation of this example, it is possible to search for a perturbation for all images for the third metric, with the first metric $d_1$ and the second metric $d_2$ left unchanged. The optimization problem may then be formulated as follows: A $\Delta$ is to be found such that $d_2(\Delta)$ is minimal for all images, with $d_1(\Delta)<3$. In other words, a $\Delta$ is to be found with $d_1(\Delta)<3$ such that the model output for all input images x looks like y".

Figure 6:
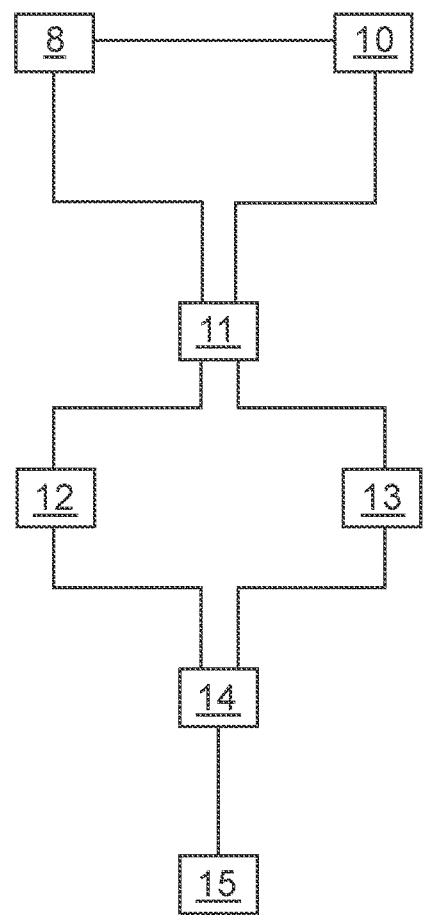
FIG. 6 schematically shows the structure of an exemplary device for generating a set of parameters.

An exemplary embodiment of a device for generating a set of parameters for a neural network will be described below with reference to FIG. 6:

The device comprises the database 8 with digital images. The generator 10 described with reference to FIG. 3 is connected to said database 8. A neural network 11 is coupled to the database 8 and the generator 10. The output of the neural network 11 is coupled to a first analysis unit 12 and a second analysis unit 13. The first analysis unit 12 generates a first analysis by means of the neural network 11 on the basis of digital images which are fed to the neural network 11 as input data from the database 8. The second analysis unit 13 generates a second analysis on the basis of perturbed input data 9 fed to the neural network 11 from the generator 10. In order to generate the perturbed input data 9, the generator 10 accesses the database 8 with the digital images and applies the target perturbation generated by the generator 10 to said images.

The first analysis unit 12 and the second analysis unit 13 are coupled to a comparison unit 14. Said comparison unit is designed to compare the first and second analysis with one another.

The comparison unit 14 is coupled to a parameter set generation unit 15. The parameter set generation unit 15 is designed to generate an improved set of parameters for the neural network 11 on the basis of the result of the comparison of the first and second analysis that was transmitted from the comparison unit 14. The set of parameters for the neural network 11 is generated by the parameter set generation unit 15 such that the perturbed input data 9 of the digital images generated by the generator 10 have little influence on the analysis of said input data by means of the neural network 11. In particular, the improved set of parameters is generated such that the effects of the perturbed input data 9 on the semantic segmentation of the digital image by means of the neural network 11 for the perturbed input data does not result in safety-related objects being incorrectly classified for a driver assistance system, or in these objects disappearing or being displayed differently. The neural network 11 may therefore be trained by means of the perturbed input data 9 generated by the generator 10.

Figure 7:
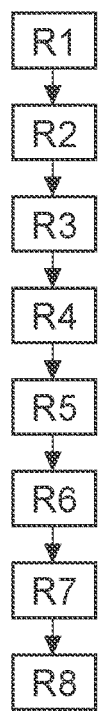
FIG. 7 shows an exemplary method for improving a set of parameters of a neural network.

A method for improving a set of parameters of a neural network will be described below with reference to FIG. 7:

In a step R1, a neural network is provided with an associated set of parameters. This neural network is to be checked.

In a step R2, training data are generated by means of a large number of digital images.

In a step R3, the neural network is trained with training data in a manner known per se and a first analysis of the digital images is generated by means of the neural network on the basis of the training data.

In a step R4, perturbed input data are generated as training data for the digital images by means of the method as explained with reference to FIG. 4.

In a step R5, a second analysis of the digital images is generated by means of the neural network on the basis of the perturbed input data, i.e. on the basis of the digital images to which the target perturbation was applied.

In a step R6, the first and the second analysis are compared with one another.

In a step R8, an improved set of parameters is generated for the neural network on the basis of the result of the comparison of the first and second analysis.

In the following, another exemplary embodiment of the generator 10 and of the method for generating perturbed input data 9 will be explained:

The generator 10 of the other exemplary embodiment comprises a first metric unit 1 and a second metric unit 2, as in the first exemplary embodiment. However, in this case, the first metric unit 1 comprises a first group having a large number of first metrics that each provide a different specification as to how the extent of a change to sensor data is measured. In this case, the second metric unit 2 comprises a second group having a large number of second metrics that each provide a different specification as to what a perturbation of the input data 9 from sensor data is directed at. The processing unit 4 coupled to the first 1 and second 2 metric unit is in this case designed to generate the optimization problem from any combination of a first metric from the first group and a second metric from the second group.

The solution unit 5 coupled to the processing unit 4 is designed to solve the optimization problem by means of at least one solution algorithm, wherein the solution specifies a target perturbation of the input data 9 from sensor data. As with the first exemplary embodiment, the generation unit 7 is also designed to generate perturbed input data 9 for a neural network 11 from sensor data by means of the target perturbation.

The method of the other exemplary embodiment proceeds in a similar manner to the method of the first exemplary embodiment. However, in this case, a first group is defined which contains the first metrics which each provide a different specification as to how the extent of a change to sensor data is measured. Furthermore, a second group is defined which contains the second metrics which each provide a different specification as to what a perturbation of sensor data is directed at. Then, any combination of a first metric from the first group and a second metric from the second group is selected and the optimization problem is generated from the selected combination of the first and second metric. Said optimization problem is then solved in the same way as in the method of the first exemplary embodiment by means of at least one solution algorithm, wherein the solution specifies a target perturbation of the input data 9. By means of the target perturbation, perturbed input data 9 are generated for the neural network 11 from sensor data.

LIST OF REFERENCE NUMERALS

1 First metric unit
2 Second metric unit
3 Third metric unit
4 Processing unit
5 Solution unit
6 Database with solution algorithms
7 Generation unit
8 Database with digital image data
9 Perturbed input data
10 Generator
11 Neural network
12 First analysis unit
13 Second analysis unit
14 Comparison unit
15 Parameter set generation unit
16 Database with perturbations
20 Driver assistance system
21 Sensor unit
22 Verification unit
23 Plausibility unit 24 Supplementary sensor unit
25 Interface for supplementary sensor data
26 Evaluation unit
27 Control unit
28 Actuators The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" used throughout the specification means "serving as an example, instance, or exemplification".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for operating a driver assistance system of a vehicle, comprising:
    recording sensor data successively from the surroundings of the vehicle;
    verifying the recorded sensor data;
    checking the verified sensor data for plausibility;
    analyzing the verified sensor data using a neural network and generating analyzed sensor data; and
    based on the analyzed sensor data, generating control data for controlling the vehicle in a partially automated or fully automated manner;
    wherein during verification of the sensor data, at least first sensor data, which were recorded at a first, earlier point in time, are compared with second sensor data, which were recorded at a second, later point in time; and
    the result of the comparison is cross-checked with data of a database in which data on perturbations to input data of a neural network are stored, wherein it is determined whether the second sensor data were generated at least in part by a perturbation to the first sensor data that is stored in the database; wherein
    during checking the verified sensor data, supplementary sensor data are obtained from the surroundings of the vehicle; the supplementary sensor data are analyzed; deviations of the second sensor data from the first sensor data are determined; and it is determined whether the deviations are in line with the analysis of the supplementary sensor data.

2. The method of claim 1, wherein the sensor data are digital images of at least one camera of the vehicle and the digital images record the surroundings of a vehicle.

3. The method of claim 2, wherein the data stored in the database describe naturally occurring perturbations.

4. The method of claim 2, comprising during the analysis of the supplementary sensor data, obtaining visibility conditions in the surroundings of the vehicle and determining whether the deviations of the second sensor data from the first sensor data at least partially result from the visibility conditions in the surroundings of the vehicle.

5. The method of claim 2, wherein an improved set of parameters of the neural network is generated by:
    providing a neural network with an associated set of parameters;
    generating training data using an example sensor data set;
    generating a first analysis of the example sensor data set on the basis of the training data using the neural network;
    generating perturbed input data as training data for the example sensor data set;
    generating a second analysis of the example sensor data set on the basis of the perturbed input data using the neural network;
    comparing the first and second analysis; and
    generating an improved set of parameters for the neural network on the basis of the result of the comparison of the first and second analysis;
    wherein the perturbed input data are generated in that:
    a first metric is defined, which specifies how the extent of a change to sensor data is measured;
    a second metric is defined, which specifies what a perturbation of sensor data is directed at;
    an optimization problem is generated from a combination of the first metric and the second metric;
    the optimization problem is solved using at least one solution algorithm, wherein the solution specifies a target perturbation of the input data, and
    perturbed input data are generated for the neural network from sensor data using the target perturbation.

6. The method of claim 1, wherein the data stored in the database describe naturally occurring perturbations.

7. The method of claim 6, comprising during the analysis of the supplementary sensor data, obtaining visibility conditions in the surroundings of the vehicle and determining whether the deviations of the second sensor data from the first sensor data at least partially result from the visibility conditions in the surroundings of the vehicle.

8. The method of claim 6, wherein an improved set of parameters of the neural network is generated by:
    providing a neural network with an associated set of parameters;
    generating training data using an example sensor data set;
    generating a first analysis of the example sensor data set on the basis of the training data using the neural network;
    generating perturbed input data as training data for the example sensor data set;
    generating a second analysis of the example sensor data set on the basis of the perturbed input data using the neural network;
    comparing the first and second analysis; and
    generating an improved set of parameters for the neural network on the basis of the result of the comparison of the first and second analysis;
    wherein the perturbed input data are generated in that:
    a first metric is defined, which specifies how the extent of a change to sensor data is measured;
    a second metric is defined, which specifies what a perturbation of sensor data is directed at;
    an optimization problem is generated from a combination of the first metric and the second metric;
    the optimization problem is solved using at least one solution algorithm, wherein the solution specifies a target perturbation of the input data, and
    perturbed input data are generated for the neural network from sensor data using the target perturbation.

9. The method of claim 1, comprising during the analysis of the supplementary sensor data, obtaining visibility conditions in the surroundings of the vehicle and determining whether the deviations of the second sensor data from the first sensor data at least partially result from the visibility conditions in the surroundings of the vehicle.

10. The method of claim 1, wherein an improved set of parameters of the neural network is generated by:
providing a neural network with an associated set of parameters;
generating training data using an example sensor data set;
generating a first analysis of the example sensor data set on the basis of the training data using the neural network;
generating perturbed input data as training data for the example sensor data set;
generating a second analysis of the example sensor data set on the basis of the perturbed input data using the neural network;
comparing the first and second analysis; and
generating an improved set of parameters for the neural network on the basis of the result of the comparison of the first and second analysis;
wherein the perturbed input data are generated in that:
a first metric is defined, which specifies how the extent of a change to sensor data is measured;
a second metric is defined, which specifies what a perturbation of sensor data is directed at;
an optimization problem is generated from a combination of the first metric and the second metric;
the optimization problem is solved using at least one solution algorithm, wherein the solution specifies a target perturbation of the input data, and
perturbed input data are generated for the neural network from sensor data using the target perturbation.

11. The method of claim 10, wherein semantic segmentation of the digital image is carried out during the first and second analysis in each case.

12. The method of claim 1, wherein an improved set of parameters of the neural network is generated by:
providing a neural network with an associated set of parameters;
generating training data using an example sensor data set;
generating a first analysis of the example sensor data set on the basis of the training data using the neural network;
generating perturbed input data as training data for the example sensor data set;
generating a second analysis of the example sensor data set on the basis of the perturbed input data using the neural network;
comparing the first and second analysis; and
generating an improved set of parameters for the neural network on the basis of the result of the comparison of the first and second analysis,
wherein the perturbed input data are generated in that:
a first group is defined, which contains first metrics that each provide a different specification as to how the extent of a change to sensor data is measured;
a second group is defined, which contains second metrics that each provide a different specification as to what a perturbation of sensor data is directed at;
any combination of a first metric from the first group and a second metric from the second group is selected;
an optimization problem is generated from the selected combination of the first and second metric;
the optimization problem is solved using at least one solution algorithm, wherein the solution specifies a target perturbation of the input data; and
perturbed input data are generated for the neural network from sensor data by means of the target perturbation.

13. The method of claim 12, wherein
a third metric is defined, which specifies what type of sensor data a perturbation is used for; and
the optimization problem is generated from a combination of at least two metrics from the first, second and third metric.

14. A driver assistance system for a vehicle, comprising:
a sensor arranged in the vehicle for recording sensor data of the surroundings of the vehicle;
a supplementary sensor, which is configured to obtain supplementary sensor data from the surroundings of the vehicle;
a verification circuit for verifying the recorded sensor data, wherein the verification circuit, during verification of the sensor data, is configured to compare at least first sensor data that were recorded at a first, earlier point in time with second sensor data that were recorded at a second, later point in time, to cross-check the result of the comparison with data of a database in which data relating to perturbations of input data of a neural network are stored, wherein it is determined whether the second sensor data were generated at least in part by a perturbation to the first sensor data that is stored in the database, the verification circuit further being configured to determine deviations of the second sensor data from the first sensor data;
an evaluation circuit, which is coupled to the sensor and in which a neural network is stored and which is configured to analyze the verified sensor using the neural network and thereby generate analyzed sensor data;
a control circuit, which is coupled to the evaluation circuit and which is configured to generate control data for controlling the vehicle in a partially automated or fully automated manner on the basis of the analyzed sensor data; and
a plausibility circuit, which is coupled to the supplementary sensor and to the verification circuit and which is configured to analyze the supplementary sensor data and to determine whether the deviations are in line with the analysis of the supplementary sensor data.

15. The driver assistance system of claim 14, wherein the sensor comprises at least one camera for recording digital images, wherein the digital images record the surroundings of a vehicle.

16. The driver assistance system of claim 14, comprising during the analysis of the supplementary sensor data, obtaining visibility conditions in the surroundings of the vehicle and determining whether the deviations of the second sensor data from the first sensor data at least partially result from the visibility conditions in the surroundings of the vehicle.

17. A method for operating a driver assistance system of a vehicle, comprising:
recording sensor data successively from the surroundings of the vehicle;
verifying the recorded sensor data;
analyzing the verified sensor data using a neural network and generating analyzed sensor data; and
based on the analyzed sensor data, generating control data for controlling the vehicle in a partially automated or fully automated manner;

wherein during verification of the sensor data, at least first sensor data, which were recorded at a first, earlier point in time, are compared with second sensor data, which were recorded at a second, later point in time; and the result of the comparison is cross-checked with data of a database in which data on perturbations to input data of a neural network are stored, wherein it is determined whether the second sensor data were generated at least in part by a perturbation to the first sensor data that is stored in the database; wherein an improved set of parameters of the neural network is generated by:
  providing a neural network with an associated set of parameters;
  generating training data using an example sensor data set;
  generating a first analysis of the example sensor data set on the basis of the training data using the neural network;
  generating perturbed input data as training data for the example sensor data set;
  generating a second analysis of the example sensor data set on the basis of the perturbed input data using the neural network;
  comparing the first and second analysis; and
  generating an improved set of parameters for the neural network on the basis of the result of the comparison of the first and second analysis;
  wherein the perturbed input data are generated in that:
    a first metric is defined, which specifies how the extent of a change to sensor data is measured;
    a second metric is defined, which specifies what a perturbation of sensor data is directed at;
    an optimization problem is generated from a combination of the first metric and the second metric;
    the optimization problem is solved using at least one solution algorithm, wherein the solution specifies a target perturbation of the input data, and
    perturbed input data are generated for the neural network from sensor data using the target perturbation.

18. A method for operating a driver assistance system of a vehicle, comprising:
  recording sensor data successively from the surroundings of the vehicle;
  verifying the recorded sensor data;
  analyzing the verified sensor data using a neural network and generating analyzed sensor data; and
  based on the analyzed sensor data, generating control data for controlling the vehicle in a partially automated or fully automated manner;
  wherein during verification of the sensor data, at least first sensor data, which were recorded at a first, earlier point in time, are compared with second sensor data, which were recorded at a second, later point in time; and the result of the comparison is cross-checked with data of a database in which data on perturbations to input data of a neural network are stored, wherein it is determined whether the second sensor data were generated at least in part by a perturbation to the first sensor data that is stored in the database; wherein an improved set of parameters of the neural network is generated by:
  providing a neural network with an associated set of parameters;
  generating training data using an example sensor data set;
  generating a first analysis of the example sensor data set on the basis of the training data using the neural network;
  generating perturbed input data as training data for the example sensor data set;
  generating a second analysis of the example sensor data set on the basis of the perturbed input data using the neural network;
  comparing the first and second analysis; and
  generating an improved set of parameters for the neural network on the basis of the result of the comparison of the first and second analysis, wherein the perturbed input data are generated in that:
    a first group is defined, which contains first metrics that each provide a different specification as to how the extent of a change to sensor data is measured;
    a second group is defined, which contains second metrics that each provide a different specification as to what a perturbation of sensor data is directed at;
    any combination of a first metric from the first group and a second metric from the second group is selected;
    an optimization problem is generated from the selected combination of the first and second metric;
    the optimization problem is solved using at least one solution algorithm, wherein the solution specifies a target perturbation of the input data; and
    perturbed input data are generated for the neural network from sensor data by means of the target perturbation.

19. The method of claim 18, wherein
  a third metric is defined, which specifies what type of sensor data a perturbation is used for; and
  the optimization problem is generated from a combination of at least two metrics from the first, second and third metric.

20. The method of claim 17, wherein semantic segmentation of the digital image is carried out during the first and second analysis in each case.

* * * * *